US009058265B2

(12) United States Patent
Behrendt et al.

(10) Patent No.: US 9,058,265 B2
(45) Date of Patent: *Jun. 16, 2015

(54) AUTOMATED FAULT AND RECOVERY SYSTEM

(71) Applicant: International Business Machines Corporation, Armonk, NY (US)

(72) Inventors: Michael M. Behrendt, Randersacker (DE); Rafah A. Hosn, New York, NY (US); Ruchi Mahindru, Elmsford, NY (US); HariGovind V. Ramasamy, Ossining, NY (US); Soumitra Sarkar, Cary, NC (US); Mahesh Viswanathan, Yorktown Heights, NY (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/710,710

(22) Filed: Dec. 11, 2012

(65) Prior Publication Data

US 2013/0283088 A1     Oct. 24, 2013

Related U.S. Application Data

(63) Continuation of application No. 13/454,220, filed on Apr. 24, 2012.

(51) Int. Cl.
    *G06F 11/00*     (2006.01)
    *G06F 11/07*     (2006.01)

(52) U.S. Cl.
    CPC ........ *G06F 11/0793* (2013.01); *G06F 11/0709* (2013.01); *G06F 11/0748* (2013.01)

(58) Field of Classification Search
    CPC ...... G06F 11/07; G06F 11/0793; G06F 11/14
    See application file for complete search history.

(56) References Cited

U.S. PATENT DOCUMENTS

| | | | |
|---|---|---|---|
| 7,634,683 B2 | 12/2009 | De La Cruz et al. | |
| 7,890,626 B1 | 2/2011 | Gadir | |
| 8,346,931 B2 * | 1/2013 | Bobak et al. | 709/226 |
| 8,375,244 B2 * | 2/2013 | Bobak et al. | 714/3 |
| 8,428,983 B2 * | 4/2013 | Bobak et al. | 705/7.11 |
| 8,447,859 B2 * | 5/2013 | Bobak et al. | 709/226 |
| 2008/0115012 A1 | 5/2008 | Jann et al. | |
| 2009/0106578 A1 * | 4/2009 | Dilman et al. | 714/2 |
| 2009/0172460 A1 * | 7/2009 | Bobak et al. | 714/2 |

(Continued)

OTHER PUBLICATIONS

U.S. Appl. No. 13/454,220, 1 page.

(Continued)

*Primary Examiner* — Christopher McCarthy
(74) *Attorney, Agent, or Firm* — Francis Lammas; Stephen J. Walder, Jr.; William J. Stock

(57) ABSTRACT

A mechanism is provided for handling incidents occurring in a managed environment. An incident is detected in a resource in the managed environment. A set of incident handling actions are identified based on incident handling rules for an incident type of the incident. From the set of incident handling actions, one incident handling action is identified to be executed based on a set of impact indicators associated with the set of incident handling rules. The identified incident handling action is then executed to address the failure of the resource.

9 Claims, 4 Drawing Sheets

(56) References Cited

U.S. PATENT DOCUMENTS

| 2010/0061250 | A1 | 3/2010 | Nugent |
| 2010/0251002 | A1 | 9/2010 | Sivasubramanian et al. |
| 2011/0023028 | A1 | 1/2011 | Nandagopal et al. |
| 2012/0047391 | A1* | 2/2012 | Dhoolia et al. ............ 714/2 |
| 2013/0111277 | A1* | 5/2013 | Klemenz et al. ............ 714/57 |
| 2013/0159764 | A1* | 6/2013 | Adar et al. ............ 714/5.1 |

OTHER PUBLICATIONS

"An effective method and system for disaster recovery in cloud environments", http://ip.com/IPCOM/000206403, Apr. 22, 2011, 1 page.

Grobauer, Bernd et al., "Towards Incident Handling in the Cloud: Challenges and Approaches", Proceedings of the 2010 ACM Workshop on Cloud Computing Security (CCSW'10), Oct. 8, 2010, pp. 77-85.

Jodi, "What is IT Incident Management", http://www.samanage.com/blog/2010/03/what-is-it-incident-management-2/, printed May 20, 2011, 3 pages.

Liu, Feng et al., "A Framework for Automated Fault Recovery Planning in Large-Scale Virtualized Infrastructures", Proceedings of the 5th IEEE International Conference on Modeling Autonomic Communication Environments (MACE'10), 2010, pp. 113-123.

Sarkar, Soumitra et al., "Automated Incident Management for a Platform-as-a-Service Cloud", Proceedings of the 11th USENIX Conference on Hot Topics in Management of Internet, Cloud, and Enterprise Networks and Services (Hot-ICE'11), 2011, 6 pages.

* cited by examiner

AUTOMATED FAULT AND RECOVERY SYSTEM

BACKGROUND

The present application relates generally to an improved data processing apparatus and method and more specifically to mechanisms for recovering from a fault in a system environment with different interdependent software and hardware layers.

Due to a stateful nature of current software, such software is prone to failures in associated underlying technology stack, such as hardware, operating system, middleware, or the like. That is, if underlying hardware fails, corresponding state information may be lost. This is normally disruptive to users working with an application utilizing the hardware. Such issues become even more challenging in multi-tenant cloud computing environments where many users are running on a shared hardware and software infrastructure. In an event of a failure in one of the components within the overall technology stack, such as hardware, hypervisor, operating system, middleware, application, or the like, corrective action must be taken to minimize the number of users affected and reduce any impact.

Current approaches to address such failures are provided by establishing high availability clusters. However, such approaches are typically complex and costly due to distributed states across many nodes. Therefore, issues remain with handling incidents & failures occurring in a shared infrastructure in an efficient fashion. Specifically, the shared nature of cloud computing environments, where many users share a technology stack consisting of servers, storage, network, operating systems, middleware, applications or the like, raise new challenges.

SUMMARY

In one illustrative embodiment, a method, in a data processing system, is provided for handling incidents occurring in a managed environment. The illustrative embodiment detects an incident in a resource in the managed environment. The illustrative embodiment identifies a set of incident handling actions based on incident handling rules for a type of incident. The illustrative embodiment identifies one incident handling action from the set of incident handling actions to be executed based on a set of impact indicators associated with the set of incident handling rules. The illustrative embodiment then executes the identified incident handling action to address the failure of the resource.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art, in view of the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for handling incidents occurring in a shared environment in a way that minimizes impact on users running on the infrastructure where the incident occurs, while minimizing costs and impact when handling such incidents in the shared environment. That is, the incident management mechanism of the illustrative embodiments detects software or hardware component failures in a shared environment, such as a cloud computing environment. When an incident occurs, such as a server going down, software hanging, strange performance behavior, network corruption, or the like, the incident management mechanism determines all interdependencies of the impacted software or hardware components and initiates fault recovery or incident handling based on a selected predefined set of policies, which may be defined by a provider based on a service level agreement or predefined by the provider based on provider internal decisions, using the determined interdependencies.

Figure 1:
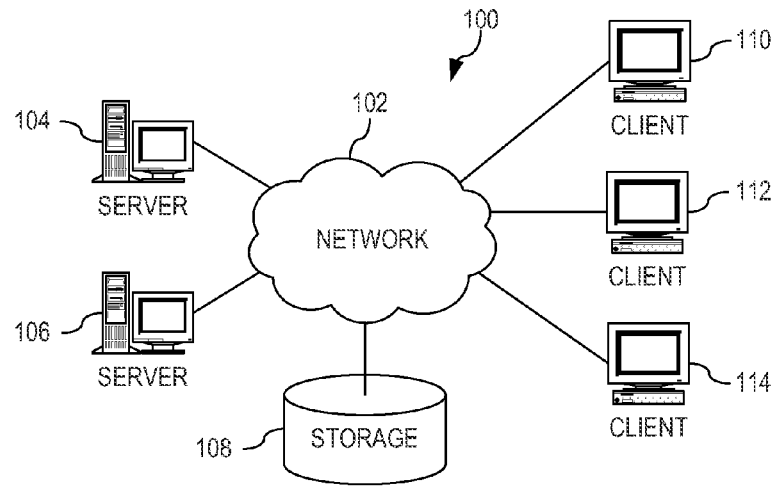
FIG. 1 depicts a pictorial representation of an example distributed data processing system in which aspects of the illustrative embodiments may be implemented.
Figure 2:
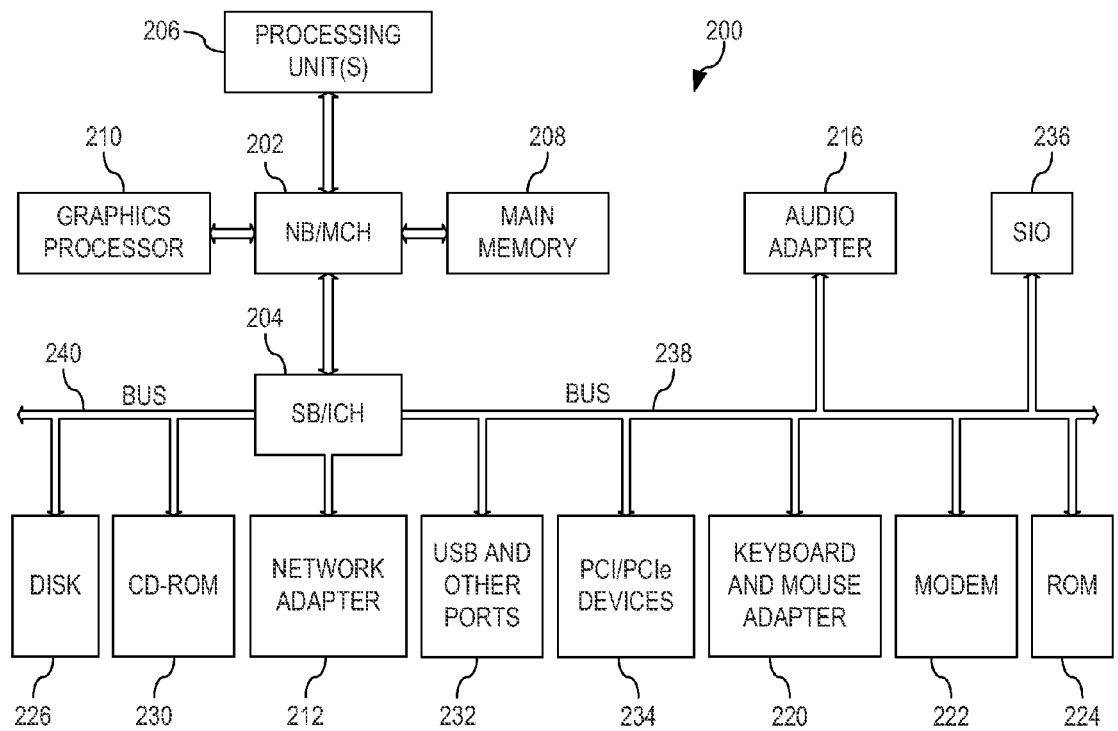
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 or server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal aerial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
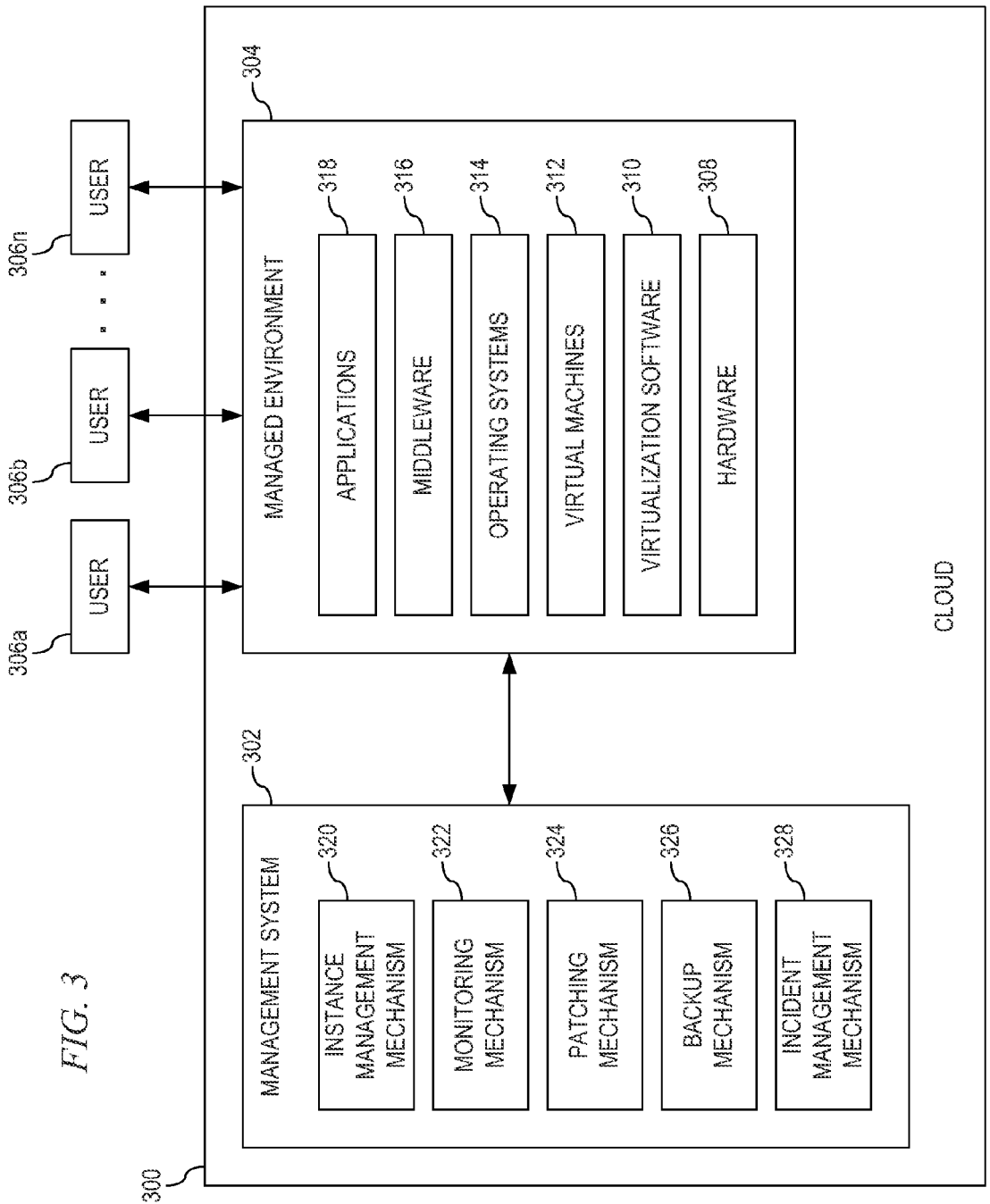
FIG. 3 depicts a block diagram of a shared environment architecture within a cloud in accordance with an illustrative embodiment.

FIG. 3 depicts a block diagram of a shared environment architecture within a cloud in accordance with an illustrative embodiment. Cloud 300 may comprise management system 302 and managed environment 304. Management system 302, which is executed by a processing unit such as processing unit 206 of FIG. 2, manages all of the users 306a, 306b, . . . , 306n, which may also be referred to as tenants, consumers, or customers, who access the shared resources, software, and services in managed environment 304 provided by cloud 300. Managed environment 304 may comprise various technology components that interact with each other. Hardware 308 represents hardware such as a server, a storage device, network device, or the like. Virtualization software 310, such as a hypervisor, virtualization machine monitor, or the like, virtualizes hardware 308 by hiding the physical characteristics of hardware 308, instead providing an abstracted computing platform.

Virtual machines (VM) 312 are a software implementation of a machine (i.e., a computer) that executes programs in a manner similar to a physical machine. Virtual machines 312 may be separated into two major categories (system and process), based on their use and degree of correspondence to any real machine. An essential characteristic of a virtual machine is that the software running inside is limited to the resources and abstractions provided by the virtual machine. Operating systems 314 may be any operating system that manages computer hardware resources such as that provided by virtual machines 312, virtualization software 310, and hardware 308. Operating systems 314 also provides common services for middleware 316 and applications 318. Examples of popular modern operating systems 314 may include Android™, iOS™, Linux™, OS X™, and Microsoft® Windows 7®.

Middleware 316 is computer software that connects operating systems 314 software components and applications 318. Middleware 316 comprises a set of services that allows multiple processes running on one or more machines to interact. That is, middleware 316 sits "in the middle" between application software 318 that may be working on different operating systems 314. Applications 318 are computer software designed to help users 306a, 306b, ..., 306n perform specific tasks. Examples of applications 318 may include enterprise software, accounting software, office suites, graphics software, media players, or the like.

However, not all of hardware 308, virtualization software 310, virtual machines 312, operating systems 314, middleware 316, and applications 318 are used for all cloud services. For example, a cloud service only providing Virtual Machine as a Service (VMaaS, belonging to the Infrastructure as a Service (IAAS) cloud service model) does not implement middleware 316 or application layer 318. However, a cloud service providing Customer Relationship Management as a Service (CRMaaS, belonging to the Software as a Service (SaaS) cloud service model) covers the entire technology stack of managed environment 304. Normally, many instances of one technology may run on top of the other, sharing the respective underlying technology layer amongst multiple instances. For example, virtualization software 310 may run multiple virtual machines 312, one virtual machine 312 may run multiple operating systems 314 when using operating system virtualization, one of operating systems 314 may run multiple middleware 316 instances, and one middleware 316 instance can run multiple applications 318. In cloud 300, a service instance dedicated to a user is a piece of dedicated technology plus "slice" of a shared technology stack in managed environment 304. For example, a service instance may be a dedicated application 318 instance running on middleware 316 shared with application 318 instances dedicated to other users, which in turn are running on operating systems 314 running multiple instances of such middleware 316 installations, and so forth.

Management system 302 maintains the operation of managed environment 304 and ensures that all service levels with respect to availability, performance, or the like promised to users 306a, 306b, ..., 306n are met. Additionally, management system 302 is responsible for:

creating a new service instance upon request from a user 306 and assigning the service instance to user 306;

tearing down service instances if the service instance is not needed;

monitoring health, availability, performance, or the like of all service instances and technology components associated with the service instances;

initiating corrective actions upon detecting that a service level agreement is not being met;

patching all components in the managed environment as needed; and/or performing backups as needed.

Thus, management system 302 may comprise mechanisms, such as instance management mechanism 320, monitoring mechanism 322, patching mechanism 324, backup mechanism 326, or, in accordance with the illustrative embodiments, incident management mechanism 328.

Figure 4:
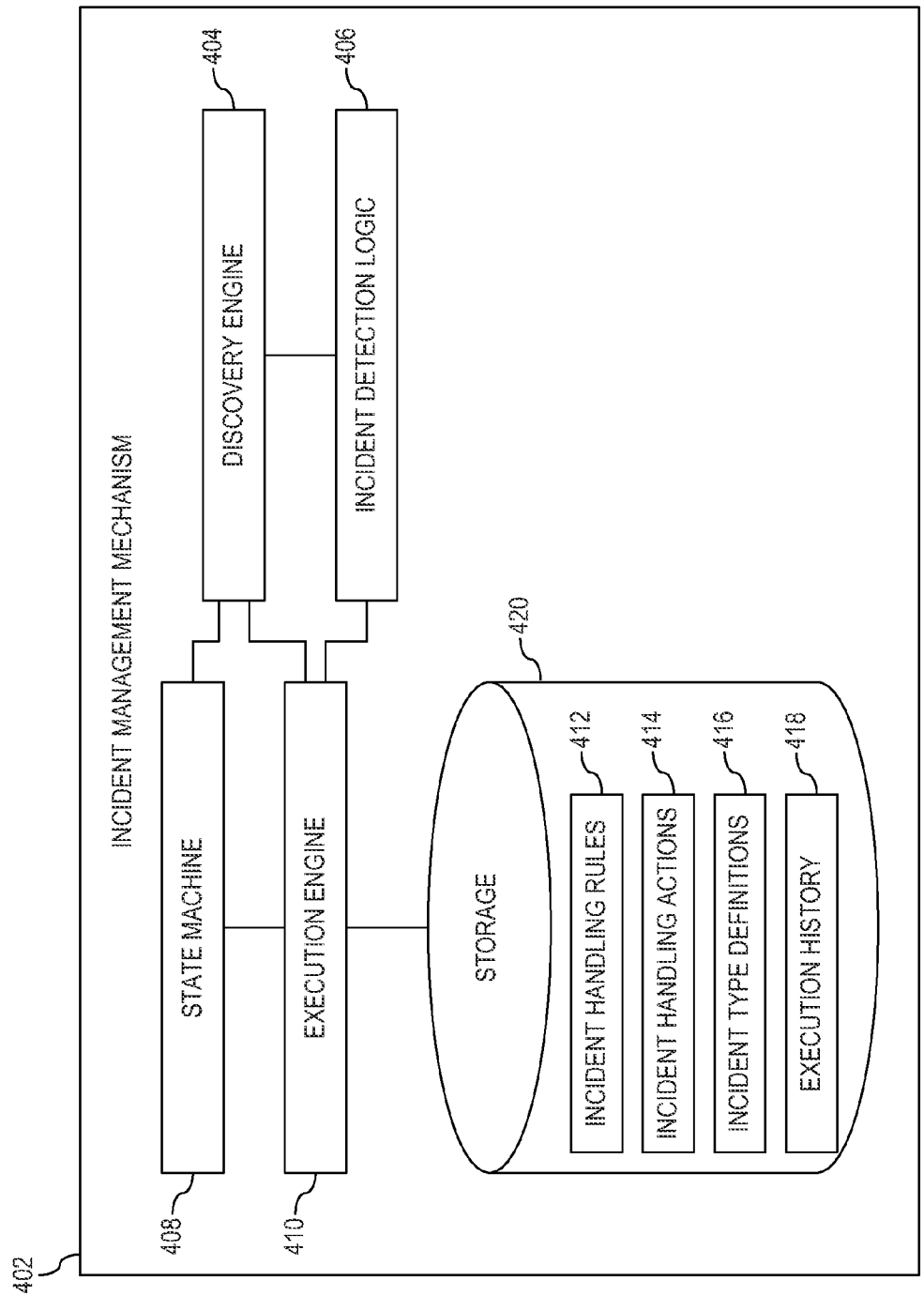
FIG. 4 depicts a functional block diagram of an incident management mechanism in a management system in accordance with an illustrative embodiment.

FIG. 4 depicts a functional block diagram of an incident management mechanism in a management system, such as management system 302 of FIG. 3, in accordance with an illustrative embodiment. Incident management mechanism 402, which is executed by a processing unit such as processing unit 206 of FIG. 2, provides for handling failures and incidents detected in a managed environment, such as managed environment 304 of FIG. 3, in a way that optimally addresses the service level objectives a provider promises to users while being as efficient as possible on the provider-side to ensure minimal costs and minimal impact. Since policies may change over time and since there are differences amongst providers, incident management mechanism 402 provides flexibility in adjustment of policies so as to be implemented in any cloud environment.

Incident management mechanism 402 comprises discovery engine 404, incident detection logic 406, state machine 408, and execution engine 410. Discovery engine 404 discovers all instances existing in the managed environment across the entire technology stack as well as which resources of the technology stack of the managed environment are used for each instance by:

discovering & monitoring all hardware;

discovering & monitoring which hypervisors are installed on top the discovered hardware;

discovering & monitoring which virtual machines and operating systems are running on which hypervisors;

discovering & monitoring which middleware is running on which operating system; and discovering & monitoring which applications are running on which middleware.

Furthermore, discovery engine 404 discovers cross-instance dependencies, such as which middleware is connected to which other middleware installation thereby constituting a distributed application. Discovery engine 404 disseminates all discoveries to the other components of incident management mechanism 402. For example, incident detection logic 406 uses the discovery information from discovery engine 404 to determine which instances in the managed environment may be impacted. That is, incident detection logic 406 uses the discovery and monitoring data to detect a state associated with each instance, which is disseminated to the other components of incident management mechanism 402. Incident detection logic 406 also monitors and detects any failure in the elements within the managed environment across the technology stack of hardware, virtualization software, virtual machines, operating systems, middleware, and applications that are used in the instances discovered by discovery engine 404.

State machine 408 uses the discovery and monitoring information to keep track of the current status of all instances and resources used by the instances in the technology stack of the managed environment. Thus, for each instance provided by discovery engine 404, state machine 408 tracks the current state information provided by incident detection logic 406. State machine 408 also maintains information for each instance as to which state transitions are possible from a current state. That is, the possible state transitions are captured as part of a state machine definition, which is created by a subject-matter expert on a per-resource type basis; for example, there is a state machine definition for VMs, middleware, applications, etc.

Execution engine 410 provides automated incident handling. Execution engine 410 receives instance and associated resource information from discovery engine 404. Execution engine 410 also receives incident information from incident detection logic 406 about discovered incidents as well as state information about the status of each resource from state machine 408. Using incident handling rules 412 and incident handling actions 414, which identify not only an action to be performed to address the incident but also an impact to the resources within managed environment that may be effected by the action, in storage 420, execution engine 410 determines which action(s) to take under which certain circumstances, which are then executed.

Each of incident handling rules 412 refer to an incident type, which are defined in incident type definitions 416 in storage 420. Whenever execution engine 410 receives notification about an incident from incident detection logic 406, execution engine 410 matches all incident handling rules 412 against incident type definitions 416 to identify which of incident handling actions 414 to perform. Each incident type definition categorizes an incident which may possibly occur in the managed environment. Exemplary incident type definitions may include "virtual machine failed", "middleware failed", "server is down", "software is down or hangs", "strange performance behavior", "network is down", or the like. Thus, incident type definitions 416 may be a data structure comprising searchable incident identifiers, titles, incident descriptions, and reference to at least one resource type being the root cause of the associated incident. Each incident definition in incident type definitions 416 may be created by a managed services provider, managed services administrator, or vendor providing the management system to the managed services provider.

Incident handling rules 412 may comprise:
  a reference to an incident definition in incident type definitions 416;
  a definition of pre-conditions to be met, indicating a pre-defined state that associated resources must be in as captured by state machine 408; and
  a reference to an incident handling action in incident handling actions 414 to be executed in the event that conditions associated with the incident handling is met.

As with incident type definitions 416, each of incident handling rules 412 may be created by a managed services provider, managed services administrator, or vendor providing the management system to the managed services provider. Critical to incident handling rules 412 is a definition as to which rule should be executed when multiple rules become eligible based on their preconditions being satisfied. Rule preconditions are based on the current values of variables that define the system state. Rule based systems implement conflict resolution techniques to select the most appropriate rule—e.g., the one with the most specific precondition—for execution, and that approach will suffice for the incident management system being described here.

Each of incident handling actions 414 may be realized as a script, workflow, or any other way of implementing an action to be executed against the resources in the managed environment. Each of incident handling actions 414 may perform any type of action on resources in the managed environment including instantiation, starting, stopping, deletion, migration, or the like, of any type of resource. As with incident type definitions 416 and incident handling rules 412, each of incident handling actions 414 may be created by a managed services provider, managed services administrator, or vendor providing the management system to the managed services provider.

Thus, each of incident handling rules 412 and incident handling actions 414 are flexibly defined, such that new rules and actions may be created, removed or changed at any time. Accordingly, exemplary incident handling rules/incident handling actions may comprise:
  if middleware instance fails, then restart middleware;
  if middleware instance fails, middleware was already restarted, and middleware is still in failed status, then reimage virtual machine hosting the middleware instance;
  if middleware instance fails, middleware was already restarted, virtual machine was reimaged, and middleware instance is still in failed status, then reimage hypervisor, or
  if middleware instance fails, middleware was already restarted, virtual machine was reimaged, hypervisor was reimaged, and middleware instance is still in failed status, then declare hypervisor as failed and move all users to new middleware instance running on different piece of hardware.

Therefore, as is illustrated, execution engine 410 keeps a record of which incident handling action has been attempted to fix a particular incident in execution history 418 in storage 420. This historical information is important to enable execution engine 410 for selecting one of incident handling actions 414 with gradually increasing chances of addressing the incident and typically increasing impact on other tenants running on the same shared piece of technology. Using incident handling rules 412, incident handling actions 414, and execution history 418, execution engine 410 determines which action(s) to take under which certain circumstances and, based on previous actions, execution engine 410 executes the identified incident handling action.

As a synopsis, incident detection logic 406 in incident management mechanism 402 detects a failure in a resource in the managed environment. Incident detection logic 406 then qualifies the failure as an incident by matching the monitoring information about a resource against the incident type definitions 416. If this matching results in a hit, incident detection logic 406 notifies execution engine 410 of the incident. Execution engine 410 obtains the status of the effected resource(s) from state machine 408 and obtains information from discovery engine 404 as to other resources that are affected by the incident with the identified resource.

Based on the state of the resource, other resources that are affected by the incident, and the incident itself, execution engine 410 identifies which of incident handling actions 414 to perform. Execution engine 410 then performs a lookup in execution history 418 to determine which incident handling actions from the identified incident handling actions 414 were previously performed in addressing the current incident. The selection of which incident handling action to perform may be based on incident handling rules 412, such as excluding any previously executed incident handling actions, whether an incident handling action maybe re-executed or not, executing an incident handling action for a predetermined amount of time, or the like. Once execution engine 410 identifies an incident handling action based on incident handling rules 412, execution engine 410 executes the incident handling action to address the current incident.

By incident management mechanism 402 combining status information about resources, dependency information about dependencies amongst resources, incident information about incidents happening in the managed environment, and incident handling actions already performed in the past, execution engine 410 reacts to encountered incidents in a way that has minimal impact on other users running on the same set of shared resources in the managed environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
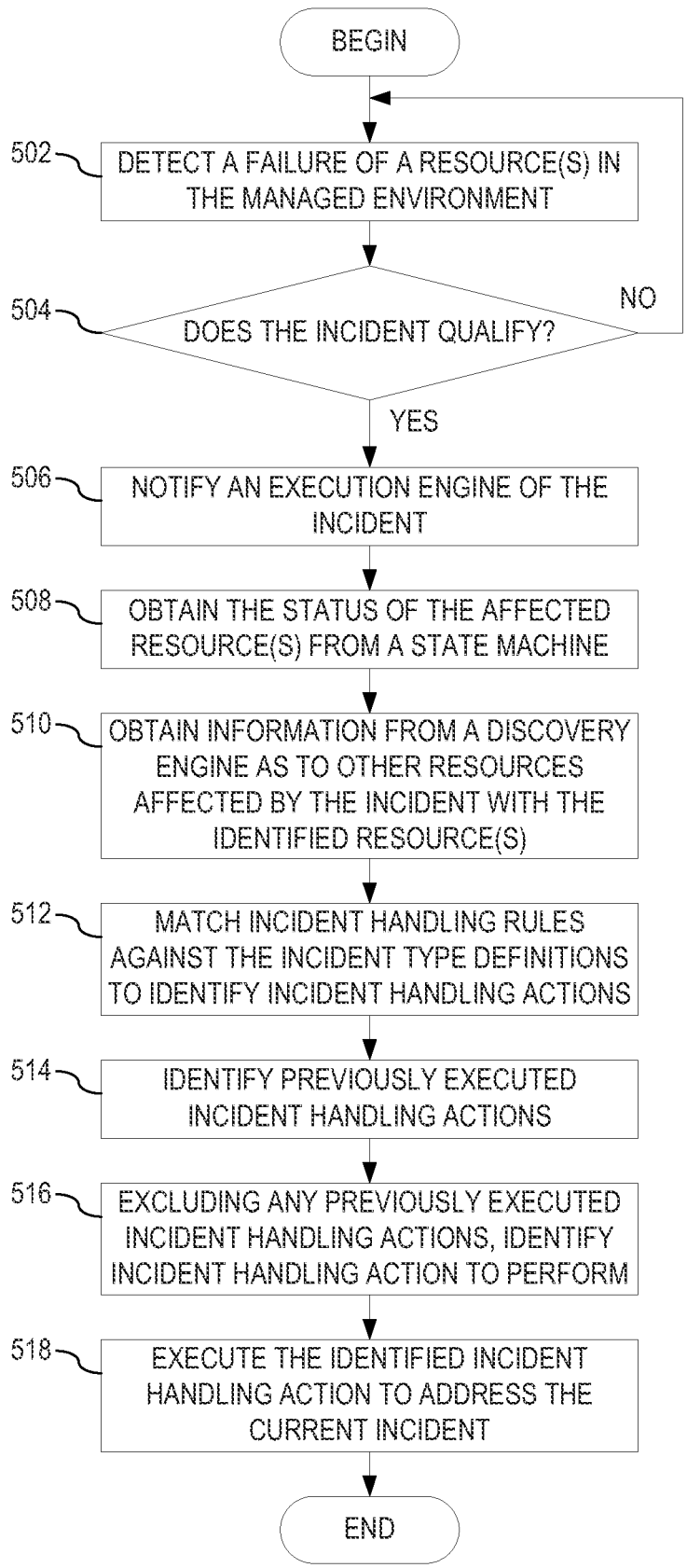
FIG. 5 depicts a flowchart of the operation performed by an incident management mechanism in accordance with an illustrative embodiment.

FIG. 5 depicts a flowchart of the operation performed by an incident management mechanism in accordance with an illustrative embodiment. As the operation begins, incident detection logic in an incident management mechanism detects a failure in a resource(s) in the managed environment (step 502). The incident detection logic then qualifies the failure as an incident by matching the monitoring information about a resource against the incident type definitions (step 504). If at step 504 the incident fails to qualify as an incident then the operation returns to step 502. If at step 504 the incident qualifies as an incident, then the incident detection logic notifies an execution engine in the incident management mechanism of the incident (step 506). The execution engine obtains the status of the effected resource(s) from a state machine (step 508) and obtains information from a discovery engine in the incident management mechanism as to other resources that are affected by the incident with the identified resource(s) (step 510).

Based on the state of the resource, other resources that are affected by the incident and the incident itself, the execution engine identifies which of a plurality of incident handling actions to perform (step 512). The execution engine then performs a lookup in an execution history to identify which incident handling actions from the identified incident handling actions were previously executed in addressing the current incident (step 514). The selection of which incident handling action to perform may be based on predetermined rules, such as excluding any previously executed incident handling actions, whether an incident handling action may be re-executed or not, executing an incident handling action a predetermined amount of time, or the like. The execution engine identifies an incident handling action to perform based on the predetermined rules (step 516) and then executes the identified incident handling action to address the current incident (step 518), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for detecting software or hardware component failures in a shared environment. When an incident occurs, the incident management mechanism determines all interdependencies of the impacted software or hardware components and initiates fault recovery or incident handling based on a selected predefined set of policies, which may be defined by a provider based on a service level agreement or predefined by the provider based on provider internal decisions, using the determined interdependencies.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for handling incidents occurring in a managed environment, the method comprising:

detecting, by a processor, an incident in a resource in the managed environment;

identifying, by the processor, a set of incident handling actions based on incident handling rules for an incident type of the incident;

from the set of incident handling actions, identifying, by the processor, one incident handling action to be executed based on a set of impact indicators associated with the set of incident handling rules, the set of impact indicators indicating an impact to one or more other resources within the managed environment and the one or more other resources being one or more of hardware, virtualization software, virtual machines, operating systems, middleware, or applications, wherein a value of an impact indicator in the set of impact indicators increases as either the number of tenants effected by the incident handling action with which the impact indicator is associated increases or the number of other applications effected by the incident handling action with which the impact indicator is associated increases; and executing, by the processor, the identified incident handling action to address the failure of the resource.

2. The method of claim 1, further comprising:

from the set of incident handling actions, identifying, by the processor, a subset of incident handling actions based on the set of incident handling rules;

excluding, by the processor, the subset of incident handling actions from consideration when identifying the one incident handling action to be executed;

from a remaining set of incident handling actions, identifying, by the processor, the one incident handling action to be executed based on impact indicators associated with the set of incident handling rules; and executing, by the processor, the identified incident handling action to address the failure of the resource.

3. The method of claim 1, further comprising:

qualifying, by the processor, the failure as an incident by matching monitoring information about a resource against a set of incident type definitions.

4. The method of claim 1, further comprising:

identifying, by the processor, a state of the resource; and filtering, by the processor, the set of incident handling actions based on the state of the resource.

5. The method of claim 1, further comprising:

identifying, by the processor, other resources affected by the failure of the resource; and filtering, by the processor, the set of incident handling actions based on the other resources affected by the failure of the resource.

6. The method of claim 1, wherein:
the incident type is one of a set of incident types and wherein the set of incident types define incidents that are identified as possibly occurring in the managed system, and
the incident handling rules define at least one of preconditions to be satisfied for the incident or, responsive to multiple incident handling rules satisfying a precondition, which incident handling rule is to be executed first from the multiple incident handling rules.

7. The method of claim 1, wherein each incident handling action in the set of incident handling actions identifies at least one action to be performed to address the incident and at least one impact to the one or more other resources within the managed environment that may be effected by the incident handling action.

8. The method of claim 7, wherein the at least one impact for each incident handling action is identified by an impact indicator, thereby forming a set of impact indicators for the set of incident handling actions.

9. The method of claim 1, wherein the one incident handling action to be executed is identified based on the set of impact indicators associated with the set of incident handling rules such that an incident handling action with a smaller impact indicator is executed before an incident handling action with a larger impact indicator.

* * * * *